(12) United States Patent
Lee

(10) Patent No.: US 10,246,602 B2
(45) Date of Patent: Apr. 2, 2019

(54) POLYOLEFIN COMPOUNDS FOR CABLE COATINGS

(71) Applicant: Union Carbide Chemicals & Plastics Technology LLC, Midland, MI (US)

(72) Inventor: Day-Chyuan Lee, Dolyestown, PA (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 15/544,179

(22) PCT Filed: Feb. 3, 2016

(86) PCT No.: PCT/US2016/016264
§ 371 (c)(1),
(2) Date: Jul. 17, 2017

(87) PCT Pub. No.: WO2016/137695
PCT Pub. Date: Sep. 1, 2016

(65) Prior Publication Data
US 2018/0010008 A1 Jan. 11, 2018

Related U.S. Application Data

(60) Provisional application No. 62/120,407, filed on Feb. 25, 2015.

(51) Int. Cl.
G02B 6/44 (2006.01)
H01B 3/44 (2006.01)
C09D 123/06 (2006.01)
G02B 6/02 (2006.01)

(52) U.S. Cl.
CPC ....... *C09D 123/06* (2013.01); *G02B 6/02395* (2013.01); *H01B 3/441* (2013.01); *H01B 3/446* (2013.01); *H01B 3/448* (2013.01); *G02B 6/443* (2013.01)

(58) Field of Classification Search
CPC .................................................... C09D 123/06
See application file for complete search history.

(56) References Cited

U.S. PATENT DOCUMENTS

| 3,422,055 A | 1/1969 | Maloney |
| 5,256,482 A | 10/1993 | Yamanouchi et al. |
| 5,378,539 A | 1/1995 | Chen |
| 6,287,692 B1 * | 9/2001 | Luo ........................ C08L 23/06 174/110 PM |
| 7,560,524 B2 | 7/2009 | Michie, Jr. et al. |
| 2015/0315401 A1 | 11/2015 | Lee |
| 2016/0289433 A1 * | 10/2016 | Seven ..................... C08L 23/06 |

FOREIGN PATENT DOCUMENTS

| EP | 1961777 A1 | 8/2008 |
| EP | 2016128 B1 | 7/2010 |
| WO | 2007/003323 A1 | 1/2007 |

OTHER PUBLICATIONS

PCT/US2016/016264, International Preliminary Report on Patentability, dated Sep. 7, 2017.
PCT/US2016/016264, International Search Report & Written Opinion, dated May 24, 2016.

* cited by examiner

Primary Examiner — Omar R Rojas

(57) ABSTRACT

Polymeric compositions comprising a blend of high-density polyethylene ("HDPE") with ethylene vinyl acetate ("EVA"), and optionally with a carbon black and/or one or more other additives, where the polymeric compositions have certain melt-index and vinyl-acetate-content ranges to improve melt strength and processability. Such polymeric compositions can be employed in manufacturing coated conductors, such as fiber optic cables.

15 Claims, No Drawings

POLYOLEFIN COMPOUNDS FOR CABLE COATINGS

REFERENCE TO RELATED APPLICATIONS

The present application claims the benefit of U.S. Provisional Application No. 62/120,407, filed on Feb. 25, 2015.

FIELD

Various embodiments of the present invention relate to polymeric coatings for cables. Other aspects of the invention concern polymeric compositions containing high-density polyethylene and ethylene vinyl acetate useful in cable manufacturing.

INTRODUCTION

The main function of fiber optical cables is transmitting data signals at high rates and long distances. Optical fibers are typically incorporated into a protective tube (such as a buffer tube) that protects the fibers from mechanical damage and/or adverse environmental conditions (such as moisture exposure). Optical cables are generally manufactured using high modulus materials to provide the cable and its components with good crush strength. An outer jacketing material, which is typically composed of polyethylene, surrounds the components of the cable.

High-density polyethylene ("HDPE") is a cost-effective jacketing material whose properties can generally be adjusted by varying the melt index and density. Conventionally, however, improvements to an HDPE's melt strength will decrease its processability, while improving its processability will adversely affect its melt strength. Accordingly, although advances in HDPE coatings for conductors (e.g., optical fibers) have been achieved, improvements are still desired.

SUMMARY

One embodiment is a coated conductor comprising:
(a) a conductor; and
(b) a polymeric composition surrounding at least a portion of said conductor,
wherein said polymeric composition comprises a high-density polyethylene and an ethylene vinyl acetate,
wherein said polymeric composition has a vinyl acetate content in the range of from 1.5 to 8 weight percent, based on the combined weight of said high-density polyethylene and said ethylene vinyl acetate,
wherein said polymeric composition has a melt index ($I_2$) of 2.0 g/10 minutes or less.

Another embodiment is a coated conductor comprising:
(a) a conductor; and
(b) a polymeric composition at least partially surrounding said conductor, said polymeric composition consisting of:
  (i) a high-density polyethylene,
  (ii) an ethylene vinyl acetate, and
  (iii) one or more additives selected from the group consisting of carbon blacks, carrier resins, flame retardants, processing aids, nucleating agents, foaming agents, tree retardants, and crosslinking agents,
wherein said polymeric composition has a vinyl acetate content in the range of from 1.5 to 8 weight percent, based on the combined weight of said high-density polyethylene and said ethylene vinyl acetate,
wherein said polymeric composition has a melt index ($I_2$) of 2.0 g/10 minutes or less.

DETAILED DESCRIPTION

Various embodiments of the present invention concern polymeric compositions suitable for use in cable coatings (e.g., cable jackets), where the polymeric compositions comprise a high-density polyethylene and an ethylene vinyl acetate. Such polymeric compositions can further comprise one or more additives, such as carbon black. The polymeric compositions can be used to prepare coated conductors, such as fiber optic cables.

High-Density Polyethylene

As just noted, the polymeric composition includes a high-density polyethylene ("HDPE") polymer. As used herein, the terms "high-density polyethylene" and "HDPE" refer to a homopolymer or interpolymer of ethylene having a density of at least 0.940 g/cm$^3$. Density is determined according to ASTM International ("ASTM") method D-792. In various embodiments, the HDPE can have a density in the range of from 0.940 to 0.980 g/cm$^3$, from 0.941 to 0.980 g/cm$^3$, from 0.945 to 0.975 g/cm$^3$, from 0.950 to 0.970 g/cm$^3$, or from 0.952 to 0.958 g/cm$^3$.

In one or more embodiments, the HDPE can have a melt index ($I_2$) in the range of from 0.01 to 45 grams per 10 minutes ("g/10 min."), from 0.1 to 10 g/10 min., from 0.15 to 5 g/10 min., from 0.5 to 2.5 g/10 min., from 1.0 to 2.0 g/10 min., or from 1.2 to 1.8 g/10 min. Melt index is determined according to ASTM D-1238, condition 190° C./2.16 kg.

In one or more embodiments, the HDPE can have a weight-average molecular weight ("Mw"), as measured by gel permeation chromatography ("GPC"), in the range of from 81,000 to 160,000 g/mol, or from 90,000 to 120,000 g/mol. Additionally, the HDPE can have a number-average molecular weight ("Mn"), as measured by GPC, of from 4,400 to 54,000 g/mol, or from 5,000 to 32,000 g/mol. In various embodiments, the molecular weight distribution ("MWD;" Mw/Mn) can range from 1.6 to 36, from 3 to 18, or from 5 to 16.

In various embodiments, the HDPE suitable for use herein can be a homopolymer, consisting entirely or substantially entirely of ethylene monomer units. In other embodiments, the HDPE can be an interpolymer, comprising ethylene monomer units and monomer units from one or more types of comonomers.

When the HDPE is an interpolymer, the HDPE can comprise at least 50, at least 60, or at least 80, mole percent (mol %) of units derived from ethylene monomer units. The other units of the HDPE are typically derived from one or more α-olefins. The α-olefin suitable for inclusion in the HDPE can be a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Illustrative HDPE interpolymers include copolymers of ethylene/propylene, ethylene/butene, ethylene/1-hexene, ethylene/1-octene, and the like. In one or more embodiments, the HDPE can be a copolymer of ethylene and 1-hexene.

The HDPE used in the practice of this invention can be non-functionalized polymers, i.e., they do not contain functional groups, such as hydroxyl, amine, amide, etc. As such, polymers like ethylene vinyl acetate, ethylene methyl or ethyl acrylate and the like, are not considered HDPE polymers within the context of this invention.

In one or more embodiments, the HDPE can be a multimodal (e.g., bimodal) HDPE. The term "multimodal," as used herein, means that the MWD in a GPC curve exhibits two or more component polymers, wherein one component polymer may even exist as a hump, shoulder or tail relative to the MWD of the component polymer. A multimodal HDPE is generally prepared from one, two, or more different catalysts and/or under two or more different polymerization conditions. A multimodal HDPE comprises at least one lower molecular weight ("LMW") component and at least one higher molecular weight ("HMW") component. Each component is prepared with a different catalyst and/or under different polymerization conditions. The prefix "multi" relates to the number of different polymer components present in the polymer. The multimodality (or bimodality) of the HDPE polymer can be determined according to known methods.

In various embodiments, the LMW component can have a density in the range of from 0.940 to 0.980 g/cm$^3$, or from 0.950 to 0.975 g/cm$^3$, and a melt index ($I_2$) of at least 50 g/10 min., or at least 80 g/10 min. The LMW component of the HDPE can be present in an amount ranging from 10 to 90 weight percent ("wt %"), or from 30 to 70 wt %, based on the total weight of the HDPE.

In various embodiments, the HMW component can have a density in the range of from 0.900 to 0.940 g/cm$^3$, or from 0.915 to 0.935 g/cm$^3$, and a melt index ($I_{21}$) of 30 g/10 min. or less, or 10 g/10 min. or less. The HMW component of the HDPE can be present in an amount of 10 to 90 wt %, or from 30 to 70 wt %, based on the total weight of the HDPE.

In one or more embodiments, the multimodal HDPE is a bimodal HDPE. As used herein, the term "bimodal" HDPE denotes a multimodal HDPE having one LMW component and one HMW component.

Multimodal HDPE can be produced using conventional polymerization processes, such as a solution, slurry, or gas-phase process, using a suitable catalyst such as a Ziegler-Natta or Phillips-type catalyst or a single-site metallocene catalyst. Non-limiting examples of multimodal HDPEs are set forth in EP 2016128(B1), U.S. Pat. No. 7,714,072 and US 2009/0068429. In various embodiments, the multimodal HDPE is produced using a gas-phase polymerization process.

An example of a suitable commercial bimodal HDPE is CONTINUUM™ DMDA-1250 NT 7, available from The Dow Chemical Company, Midland, Mich., USA.

Ethylene Vinyl Acetate

As noted above, the polymeric composition further comprises an ethylene vinyl acetate ("EVA"). As known in the art, EVAs are copolymers of ethylene with vinyl acetate. EVAs suitable for use herein can be prepared using any conventional or hereafter discovered polymerization process.

In various embodiments, the EVA employed in preparing the polymeric composition can have a vinyl acetate content in the range of from 5 to 50 wt %, from 10 to 40 wt %, from 12 to 30 wt %, or from 18 to 28 wt %, based on the total EVA weight. Additionally, the EVA can have a melt index ($I_2$) in the range of from 0.1 to 55 g/10 min., from 0.2 to 25 g/10 min., from 0.35 to 15 g/10 min., or from 0.7 to 6 g/10 min. Furthermore, the EVA can have a density in the range of from 0.930 to 0.965 g/cm$^3$, from 0.933 to 0.960 g/cm$^3$, or from 0.940 to 0.950 g/cm$^3$. It should be noted that the vinyl acetate content and melt index of the EVA can be selected according to the desired vinyl acetate content and melt index of the overall polymeric composition, as discussed in greater detail, below.

Suitable commercial EVAs include, but are not limited to, ELVAX™ 670, ELVAX™ 3165, and ELVAX™ 3175, all available from E. I. du Pont de Nemours and Company, Wilmington, Del., USA.

Additives

As noted above, the polymeric composition may contain one or more additives. Such additives include, but are not limited to, carbon blacks (optionally as part of a masterbatch further comprising a carrier resin), flame retardants, processing aids, nucleating agents, foaming agents, crosslinking agents, fillers, pigments or colorants, coupling agents, antioxidants, ultraviolet stabilizers (including UV absorbers), tackifiers, scorch inhibitors, antistatic agents, slip agents, plasticizers, lubricants, viscosity control agents, anti-blocking agents, surfactants, extender oils, acid scavengers, metal deactivators, vulcanizing agents, and combinations of two or more thereof.

In various embodiments, the polymeric composition can optionally contain a non-conductive carbon black commonly used in cable jacket. The carbon black component can be compounded with the HDPE and EVA, either neat or as part of a pre-mixed masterbatch. In embodiments, when included, the amount of a carbon black in the composition can be greater than zero to 5 wt %, from 1 to 4 wt %, or from 2 to 3 wt %, based on the total weight of the polymeric composition. When the carbon black is present in the form of a masterbatch, the masterbatch can further comprise an ethylene-based polymer carrier resin (e.g., linear-low-density polyethylene), and the carbon black can constitute in the range of from 30 to 60 wt %, from 40 to 50 wt %, or from 43 to 47 wt %, based on the total masterbatch weight. When employed, the carbon-black masterbatch can be present in the polymeric composition in an amount ranging from 1 to 10 wt %, from 3 to 8 wt %, or from 5 to 7 wt %, based on the total weight of the polymeric composition.

In various embodiments, the polymeric composition can optionally include a conductive carbon black at a high level for semiconductive applications.

Non-limiting examples of conventional carbon blacks include the grades described by ASTM N550, N472, N351, N110 and N660, Ketjen blacks, furnace blacks and acetylene blacks. Other non-limiting examples of suitable carbon blacks include those sold under the tradenames BLACK PEARLS®, CSX®, ELFTEX®, MOGUL®, MONARCH®, REGAL® and VULCAN®, available from Cabot. An example of a commercial carbon black masterbatch is AXELERON™ GP C-0037 BK, available from The Dow Chemical Company, Midland, Mich., USA.

The remaining additives listed above can be employed in conventional amounts, and may be employed neat or as part of a masterbatch.

Non-limiting examples of flame retardants include, but are not limited to, aluminum hydroxide and magnesium hydroxide.

Non-limiting examples of processing aids include, but are not limited to, fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids; polysiloxanes; and fluoroelastomers such as VITON® available from Du Pont Performance Elastomers LLC, or DYNAMAR™ available from Dyneon LLC.

A non-limiting example of a nucleating agent is HYPERFORM® HPN-20E (1,2-cyclohexanedicarboxylic acid calcium salt with zinc stearate) from Milliken Chemicals, Spartanburg, S.C.

Non-limiting examples of fillers include, but are not limited to, various flame retardants, clays, precipitated silica and silicates, fumed silica, metal sulfides and sulfates such as molybdenum disulfide and barium sulfate, metal borates such as barium borate and zinc borate, metal anhydrides such as aluminum anhydride, ground minerals, and elastomeric polymers such as ethylene-propylene-diene ("EPDM") and ethylene-propylene rubbers ("EPR"). If present, fillers are generally added in conventional amounts, e.g., from 5 wt % or less to 50 or more wt % based on the weight of the composition.

Polymeric Composition

The type and relative amounts of the HDPE and EVA in the polymeric composition can be selected to produce a final polymeric composition having certain characteristics. For instance, if an EVA is selected that has a high vinyl acetate content, a relatively lower amount of EVA may be used in the polymeric composition to achieve a certain vinyl acetate concentration in the final polymeric composition versus using an EVA having a low vinyl acetate content. Additionally, the melt index of both the HDPE and EVA can be considered in achieving a desired melt index of the polymeric composition as a whole.

In various embodiments, the relative amounts of HDPE and EVA employed can be selected such that the resulting polymeric composition has a vinyl acetate content in the range of from 1.5 to 8 wt %, or from 1.9 to 6 wt %, based on the combined weight of the HDPE and EVA. Additionally, the polymeric composition can have a vinyl acetate content in the range of from 1.5 to 8 wt %, or from 1.8 to 5.6 wt % based on the total weight of the polymeric composition.

In various embodiments, the polymeric composition can have a melt index ($I_2$) of 2.0 g/10 min. or less, or in the range of from 1.3 to 1.9 g/10 min., or from 1.4 to 1.88 g/10 min.

Though not wishing to be bound by theory, it is believed that polymeric compositions having the foregoing described vinyl acetate content and melt index can achieve a surprising balance of improved melt strength and improved processability. Particularly, in various embodiments, the polymeric composition can have a high-shear viscosity (100 $sec^{-1}$) that is at least 1%, at least 2%, or at least 3% lower than the high-shear viscosity of an identical comparative polymeric composition, except that the comparative polymeric composition does not contain EVA. In one or more embodiments, the decrease in high-shear viscosity can be in the range of from 1 to 10%, from 1 to 5%, or from 1 to 3%. A decrease in high-shear viscosity is indicative of improved processability. Additionally, in various embodiments, the polymeric composition can have a low-shear viscosity (0.1 $sec^{-1}$) that is at least 1%, at least 2%, at least 3%, or at least 4% higher than the low-shear viscosity of an identical comparative polymeric composition, except that the comparative polymeric composition does not contain EVA. In one or more embodiments, the increase in low-shear viscosity can be in the range of from 1 to 10%, from 1 to 6%, or from 1 to 4%. An increase in low-shear viscosity indicates improved melt strength. High-shear viscosity and low-shear viscosity are determined according to the procedures described in the Test Methods section, below.

In one or more embodiments, the amount of HDPE present in the polymeric composition can be in the range of from 70 to 95 wt %, or from 78 to 90 wt %, based on the combined weight of the HDPE and the EVA. Additionally, the HDPE can be present in an amount ranging from 50 to 90 wt %, or from 70 to 85 wt %, based on the entire weight of the polymeric composition.

In various embodiments, the amount of EVA present in the polymeric composition can be in the range of from 5 to 30 wt %, or from 10 to 22 wt %, based on the combined weight of the HDPE and the EVA. Additionally, the EVA can be present in an amount ranging from 1 to 30 wt %, or from 10 to 20 wt %, based on the entire weight of the polymeric composition.

The polymeric composition can be prepared by any suitable method. For example, the EVA, optionally carbon black and any additives (e.g., fillers, etc.) can be added to a melt containing the HDPE. Such compounding of the components can be performed by blending, for example, using an internal batch mixer such as a Banbury or Bolling internal mixer. Alternatively, continuous single or twin screw mixers can be used, such as a Farrel continuous mixer, a Werner and Pfleiderer twin screw mixer, or a Buss kneading continuous extruder.

The carbon black and/or the additives can be introduced into the HDPE alone (neat) or as a pre-mixed masterbatch. Such masterbatches are commonly formed by dispersing the carbon black and/or additives into an inert carrier resin (e.g., polyethylene). Masterbatches are conveniently formed by melt compounding methods. In one or more embodiments, the HDPE can be compounded with the EVA component and optional additives, without carbon black. In other embodiments, the HDPE, EVA, and carbon black (neat or as a pre-mixed master batch) can be compounded, optionally with one or more additives.

Articles of Manufacture

In one or more embodiments, the polymeric composition can be used to prepare a cable, such as by being applied to a conductor or conductive core as a sheath or insulation layer in known amounts and by known methods, for example, with the equipment and methods described, for example, in U.S. Pat. No. 5,246,783, U.S. Pat. No. 6,714,707, U.S. Pat. No. 6,496,629 and US 2006/0045439. Typically, the polymeric composition is prepared in an extruder equipped with a cable-coating die and, after the components of the composition are formulated, the composition is extruded over the conductor or conductive core as it is drawn through the die. Accordingly, the polymeric composition can at least partially surround a conductor. As used herein, the terms "surround" or "surrounding" means that the polymeric composition, in the form of a coating, lies in direct contact with the conductor, or lies in indirect contact with the conductor, such as by being coated on top of one or more interceding layers between the conductor and the polymeric composition.

In various embodiments, the polymeric composition can be used to prepare a jacket having a thin-wall construction. In such embodiments, the thin-wall jacket can have a thickness ranging from 10 to 30 mils, from 15 to 25 mils, or about 20 mils.

In one or more embodiments, the polymeric composition can be used as a coating in a fiber optic cable. In such a construction, the polymeric composition can be used to form a buffer tube (used to hold bundles of optical fibers within a fiber optic cable) or an outer jacket. Typical fiber optic cable constructions can be found, for example, in US Published Application No. 2006/0045439.

Definitions

"Cable" means at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. No. 5,246,783, 6,496,629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Polymer" means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers (three different monomers), quaterpolymers (four different monomers), etc.

Test Methods

Density

Density is determined according to ASTM D 792.

Melt Index

Melt index, or $I_2$, is measured in accordance with ASTM D 1238, condition 190° C./2.16 kg, and is reported in grams eluted per 10 minutes.

Shear Viscosity

Rheological measurements are done via dynamic oscillatory shear experiments conducted with TA Instruments. Experiments are run in parallel plate mode under a nitrogen atmosphere at 190° C. Sample size is 50 mils thick and 1.6 inch in diameter. The frequency sweep experiments cover a frequency range of 1 to 1000 $sec^{-1}$ with 0.25% strain. The torque response is converted by the TA instrument's ARES rheometer control software to dynamic module and dynamic viscosity data at each frequency.

Storage Modulus (Dynamic Mechanical Analysis)

The storage modulus is measured by testing a compression-molded plaque using a DMA Q800 made by TA Instruments Inc. The data are collected with the use of a Dynamic Mechanical Analysis ("DMA") bending test procedure using a single cantilever setup, wherein the sample is mounted onto a stationary clamp at one end, while the other end is mounted onto a movable clamp. The movable clamp then bends the sample in a sinusoidal motion by applying a small strain percent of 0.025% during the test. The frequency of the bending motion is 1 Hz. While the sample is being bent, it goes through a temperature ramp program from −50° C. to +150° C. via a rate increase of 5° C. per minute. The resulting measurements are then processed by the standard machine software, and the storage modulus data are reported.

Vinyl Acetate Content

Vinyl acetate content of the commercial EVA ("cEVA") is published by the resin suppliers and then calculated for the final compound containing this cEVA based on its weight percentage in compound.

Molecular Weight Distribution

The gel permeation chromatography ("GPC") system consists of a Polymer Char GPC-IR High Temperature Chromatograph, equipped with an IR4 infra-red detector from Polymer ChAR (Valencia, Spain). Data collection and processing is performed using Polymer Char software. The system is also equipped with an on-line solvent degassing device.

Suitable high temperature GPC columns can be used, such as four 30 cm long Shodex HT803 13 micron columns, or four 30 cm Polymer Labs columns of 13-micron mixed-pore-size packing (Olexis LS, Polymer Labs). The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4-trichlorobenzene ("TCB") containing 200 ppm of 2,6-di-tert-butyl-4methylphenol ("BHT"). The solvent is sparged with nitrogen. The polymer samples are stirred at 160° C. for four hours. The injection volume is 200 microliters. The flow rate through the GPC is set at 1 mL/minute.

The GPC column set is calibrated by running 21 narrow molecular weight distribution polystyrene standards. The molecular weight ("MW") of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to, or greater than, 1,000,000 g/mol, and at 0.05 g in 50 mL of solvent for molecular weights less than 1,000,000 g/mol. The polystyrene standards are dissolved at 80° C., with agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})B \quad \text{(Eq. 1)}$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as discussed below. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \sum_i w_i / \sum_i (w_i / M_{cc,i}) \quad \text{(Eq. 3)}$$

-continued $$M_{z,cc} = \sum (w_i M_{cc,i}^2) / \sum (w_i M_{cc,i}) \quad \text{(Eq. 4)}$$

Materials

The following materials are employed in the Examples, below.

The HDPE employed is CONTINUUM™ DMDA-1250 NT 7, which is a bimodal HDPE having a melt index ($I_2$) of 1.5 g/10 min. and a density of 0.955 g/cm³, and is commercially available from The Dow Chemical Company, Midland, Mich., USA.

ELVAX™ 670 is an EVA having a vinyl acetate ("VA") content of 12 wt %, a melt index ($I_2$) of 0.35 g/10 min., a density of 0.933 g/cm³, and is commercially available from E. I. du Pont de Nemours and Company, Wilmington, Del., USA.

ELVAX™ 3165 is an EVA having a VA content of 18 wt %, a melt index ($I_2$) of 0.7 g/10 min., a density of 0.940 g/cm³, and is commercially available from E. I. du Pont de Nemours and Company, Wilmington, Del., USA.

ELVAX™ 3175 is an EVA having a VA content of 28 wt %, a melt index ($I_2$) of 6.0 g/10 min., a density of 0.950 g/cm³, and is commercially available from E. I. du Pont de Nemours and Company, Wilmington, Del., USA.

The carbon black masterbatch ("CB MB") is AXELERON™ GP C-0037 BK, which is a blend of carbon black in a linear-low-density polyethylene carrier resin. The CB MB has a carbon black content of 45 wt %, a density of 1.18 g/cm³, and is commercially available from The Dow Chemical Company, Midland, Mich., USA.

EXAMPLES

Prepare six Comparative Samples (CS1-CS6) and three Samples (S1-S3) according to the formulations provided below in Table 1, below. CS1-CS6 and S1-S3 are prepared using the following procedure. The composition blends are prepared by introducing the HDPE polymer(s), EVA copolymer, and the carbon black master batch into a Brabender mixing bowl and mixing at 50 RPM at 185° C. for 5 minutes. The mixed compound is compression molded to produce an 8"×8"×50 mils plaque using a Wabash electric press operated in the manual mode. The press is preheated to 179° C. (±5° C.), the material is pre-weighed and placed in the center of a 50-mil stainless steel plaque between a mold assembly made of mold release-treated Mylar and aluminum sheets. The filled mold is then placed into the press at 500 psi for 7 minutes. After 7 minutes, the pressure is increased to 2,500 psi for 3 minutes. The plaque is then slowly cooled at a rate of −15° C. per minute and removed when the temperature reaches room temperature.

TABLE 1

Compositions of CS1-CS6 and S1-S3

| | CS1 | CS2 | CS3 | CS4 | S1 | S2 | S3 | CS5 | CS6 |
|---|---|---|---|---|---|---|---|---|---|
| HDPE (wt %) | 94.15 | 89.15 | 89.15 | 84.15 | 84.15 | 84.15 | 74.15 | 64.15 | 54.15 |
| ELVAX 670 (wt %) | — | 5.00 | — | 10.00 | — | — | — | — | — |
| ELVAX 3165 (wt %) | — | — | 5.00 | — | 10.00 | — | — | — | — |
| ELVAX 3175 (wt %) | — | — | — | — | — | 10.00 | 20.00 | 30.00 | 40.00 |
| CB MB (wt %) | 5.85 | 5.85 | 5.85 | 5.85 | 5.85 | 5.85 | 5.85 | 5.85 | 5.85 |
| Total: | 100.00 | 100.00 | 100.00 | 100.00 | 100.00 | 100.00 | 100.00 | 100.00 | 100.00 |

Analyze CS1-CS6 and S1-S3 according to the Test Methods provided above. The results are provided in Table 2, below.

TABLE 2

Properties of CS1-CS6 and S1-S3

| | CS1 | CS2 | CS3 | CS4 | S1 | S2 | S3 | CS5 | CS6 |
|---|---|---|---|---|---|---|---|---|---|
| VA content of total composition (wt %) | — | 0.60 | 0.90 | 1.20 | 1.80 | 2.80 | 5.60 | 8.40 | 11.20 |
| VA content based on HDPE + EVA only (wt %) | — | 0.64 | 0.96 | 1.27 | 1.91 | 2.97 | 5.95 | 8.92 | 11.90 |
| Melt Index ($I_2$, g/10 min.) | 1.40 | 1.36 | 1.40 | 1.33 | 1.40 | 1.54 | 1.88 | 2.21 | 2.89 |
| Storage Modulus @ 20° C. (MPa) | 2.396 | 2.131 | 2.090 | 2.109 | 1.902 | 1.699 | 1.395 | 1.042 | 6.14 |
| High-shear Viscosity (100 sec⁻¹) (Pa · s) | 864 | 886 | 899 | 901 | 837 | 838 | 766 | 671 | 619 |
| Low-shear Viscosity (0.1 sec⁻¹) (Pa · s) | 7.653 | 7.442 | 8.309 | 8.548 | 7.978 | 9.026 | 8.404 | 7.641 | 6.741 |
| Relative High-shear Viscosity* (100 sec⁻¹) | — | >1 | >1 | >1 | <1 | <1 | <1 | <1 | <1 |
| Relative Low-shear Viscosity* (0.1 sec⁻¹) | — | <1 | >1 | >1 | >1 | >1 | >1 | ~1 | <1 |

*Relative shear viscosities are determined as the ratio of the Sample or Comparative Sample over CS1.

As can be seen from the results provided in Table 1, only those samples having a vinyl acetate content in the range of from greater than 1.2 wt % (e.g., at least about 1.5 wt %) to less than 8.4 wt % (e.g., up to about 8 wt %) and a melt index of about 2.0 g/10 min. or less exhibit both improved processability (i.e., a lower high-shear viscosity relative to CS1) and improved melt strength (i.e., a higher low-shear viscosity relative to CS1).

The invention claimed is:

1. A coated conductor comprising:
   (a) a conductor; and
   (b) a polymeric composition surrounding at least a portion of said conductor,
   wherein said polymeric composition comprises a high-density polyethylene and an ethylene vinyl acetate,
   wherein said polymeric composition has a vinyl acetate content in the range of from 1.5 to 8 weight percent, based on the combined weight of said high-density polyethylene and said ethylene vinyl acetate,
   wherein said polymeric composition has a melt index ($I_2$) in the range of from 1.3 to 1.9 g/10 min.,
   wherein said ethylene vinyl acetate has a vinyl acetate content in the range of from 18 to 28 weight percent, based on the total weight of said ethylene vinyl acetate.

2. The coated conductor of claim 1, wherein said polymeric composition has a vinyl acetate content in the range of from 1.9 to 6.0 weight percent, based on the combined weight of said high-density polyethylene and said ethylene vinyl acetate.

3. The coated conductor of claim 1, wherein said polymeric composition has a melt index ($I_2$) in the range of from 1.4 to 1.88 g/10 minutes.

4. The coated conductor of claim 1, wherein said polymeric composition has a high-shear viscosity (100 sec$^{-1}$) that is at least 1% lower than the high-shear viscosity of an identical comparative polymeric composition, except that said comparative polymeric composition does not contain ethylene vinyl acetate, wherein said polymeric composition has a low-shear viscosity (0.1 sec$^{-1}$) that is at least 1% higher than the low-shear viscosity of an identical comparative polymeric composition, except that said comparative polymeric composition does not contain ethylene vinyl acetate.

5. The coated conductor of claim 1, wherein said ethylene vinyl acetate has a melt index ($I_2$) in the range of from 0.7 to 6 g/10 minutes.

6. The coated conductor of claim 1, wherein said high-density polyethylene is present in said polymeric composition in an amount ranging from 70 to 95 weight percent based on the combined weight of said high-density polyethylene and said ethylene vinyl acetate, wherein said ethylene vinyl acetate is present in an amount ranging from 5 to 30 weight percent based on the combined weight of said high-density polyethylene and said ethylene vinyl acetate.

7. The coated conductor of claim 1, wherein said high-density polyethylene is a bimodal high-density polyethylene.

8. The coated conductor of claim 1, wherein said polymeric composition further comprises one or more additives selected from the group consisting of carbon blacks, carrier resins, flame retardants, processing aids, nucleating agents, foaming agents, crosslinking agents, fillers, pigments or colorants, coupling agents, antioxidants, ultraviolet stabilizers, tackifiers, scorch inhibitors, antistatic agents, slip agents, plasticizers, lubricants, viscosity control agents, anti-blocking agents, surfactants, extender oils, acid scavengers, metal deactivators, and vulcanizing agents.

9. The coated conductor of claim 1, wherein said polymeric composition is present in the form of a jacket surrounding said conductor, wherein said jacket has a thin-wall construction having a thickness in the range of from 10 to 30 mils.

10. The coated conductor of claim 1, wherein said coated conductor is a fiber optic cable.

11. A coated conductor comprising:
    (a) a conductor; and
    (b) a polymeric composition at least partially surrounding said conductor, said polymeric composition consisting of:
        (i) a high-density polyethylene,
        (ii) an ethylene vinyl acetate, and
        (iii) optionally one or more additives selected from the group consisting of carbon blacks, carrier resins, flame retardants, processing aids, nucleating agents, foaming agents, fillers, pigments or colorants, coupling agents, antioxidants, ultraviolet stabilizers, tackifiers, scorch inhibitors, antistatic agents, slip agents, plasticizers, lubricants, viscosity control agents, anti-blocking agents, surfactants, extender oils, acid scavengers, metal deactivators, and vulcanizing agents,
    wherein said polymeric composition has a vinyl acetate content in the range of from 1.5 to 8 weight percent, based on the combined weight of said high-density polyethylene and said ethylene vinyl acetate,
    wherein said polymeric composition has a melt index ($I_2$) of 2.0 g/10 minutes or less,
    wherein said ethylene vinyl acetate has a vinyl acetate content in the range of from 18 to 28 weight percent, based on the total weight of said ethylene vinyl acetate.

12. The coated conductor of claim 11, wherein said polymeric composition has a vinyl acetate content in the range of from 1.9 to 6.0 weight percent, based on the combined weight of said high-density polyethylene and said ethylene vinyl acetate, wherein said polymeric composition has a melt index ($I_2$) in the range of from 1.4 to 1.88 g/10 minutes.

13. The coated conductor of claim 11, wherein said polymeric composition has a high-shear viscosity (100 sec$^{-1}$) that is at least 1% lower than the high-shear viscosity of an identical comparative polymeric composition, except that said comparative polymeric composition does not contain ethylene vinyl acetate, wherein said polymeric composition has a low-shear viscosity (0.1 sec$^{-1}$) that is at least 1% higher than the low-shear viscosity of an identical comparative polymeric composition, except that said comparative polymeric composition does not contain ethylene vinyl acetate.

14. The coated conductor of claim 11, wherein said ethylene vinyl acetate has a melt index ($I_2$) in the range of from 0.7 to 6 g/10 minutes.

15. The coated conductor of claim 11, wherein said high-density polyethylene is present in said polymeric composition in an amount ranging from 70 to 90 weight percent based on the combined weight of said high-density polyethylene and said ethylene vinyl acetate, wherein said ethylene vinyl acetate is present in an amount ranging from 10 to 30 weight percent based on the combined weight of said high-density polyethylene and said ethylene vinyl acetate, wherein said high-density polyethylene is a bimodal high-density polyethylene.

* * * * *